United States Patent [19]

Hergenrother

[11] 4,375,536

[45] Mar. 1, 1983

[54] POLYPHENYLQUINOXALINES CONTAINING PENDANT PHENYLETHYNYL AND ETHYNYL GROUPS

[75] Inventor: Hans M. Mark, Acting Administrator of the National Aeronautics and Space Administration, with respect to an invention of Paul M. Hergenrother, Yorktown, Va.

[73] Assignee: The United States of America as represented by the Administrator of the National Aeronautics and Space Administration, Washington, D.C.

[21] Appl. No.: 320,621

[22] Filed: Nov. 12, 1981

[51] Int. Cl.$^3$ ............................................. C08G 73/06
[52] U.S. Cl. .................................... 528/125; 526/259; 526/285; 528/12; 528/38; 528/126; 528/128; 528/220; 528/222; 528/228; 528/229
[58] Field of Search ............... 528/125, 126, 128, 220, 528/12, 38, 222, 228, 229; 526/259, 285

[56] References Cited

U.S. PATENT DOCUMENTS

| | | | |
|---|---|---|---|
| 3,661,850 | 5/1972 | Stille | 528/229 |
| 3,734,818 | 5/1973 | Stille | 528/229 |
| 3,746,687 | 7/1973 | Duffy et al. | 528/229 |
| 3,766,141 | 10/1973 | Augl et al. | 528/229 |
| 3,792,017 | 2/1974 | Arnold et al. | 528/229 |
| 3,792,243 | 2/1974 | Arnold et al. | 528/229 |
| 3,852,243 | 12/1974 | Hergenrother | 528/229 |
| 3,852,244 | 12/1974 | Heath et al. | 528/229 |
| 3,876,614 | 4/1975 | Hedberg et al. | 528/229 |
| 3,904,584 | 9/1975 | Jones et al. | 528/229 |
| 3,966,729 | 6/1976 | Kovar et al. | 528/229 |
| 4,098,825 | 7/1978 | Arnold et al. | 528/229 |
| 4,147,868 | 4/1979 | Arnold et al. | 528/229 |

Primary Examiner—Lester L. Lee
Attorney, Agent, or Firm—Wallace J. Nelson; John R. Manning; Howard J. Osborn

[57] ABSTRACT

Poly(phenylquinoxaline) prepolymers containing pendant phenylethynyl and ethynyl groups are disclosed along with the process for forming these polymers. Novel monomers and the process for producing same that are employed to prepare the novel polymers are also disclosed.

22 Claims, No Drawings

POLYPHENYLQUINOXALINES CONTAINING PENDANT PHENYLETHYNYL AND ETHYNYL GROUPS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; USC 2457).

BACKGROUND OF THE INVENTION

High temperature structural resins are needed which can be fabricated without the evolution of volatiles, which exhibit good mechanical performance under a variety of environmental conditions and are thereby useful for structural applications in the construction of advanced aircraft and space vehicles. Although a significant effort has been devoted to the development of high temperature structural resins, presently available materials are plagued by their own unique combination of problems such as poor processability, solvent and moisture sensivity, microcracking, low impact strength, and poor dimensional stability at elevated temperature. In an attempt to develop a more aceptable structural resin, attention herein has focused on the use of the ethynyl and phenyethynyl groups as a means of rigidizing and crosslinking polymers.

Polyphenylquinoxalines (PPQ) are high temperature thermoplastics which exhibited excellent performance as structural resins (e.g. adhesives and composite matrices) at temperatures less than their glass transition or heat distortion temperatures. Polyphenylquinoxalines have also exhibited good potential for use as protective coatings even though they exhibit a sensitivity toward certain solvents. It is highly desirable to increase their use temperature and improve their solvent resistance.

Several routes have been used in an attempt to improve the dimensional stability of these polymers at elevated temperatures. Linear thermoplastic PPQs have been exposed (post cured) to high temperatures to induce crosslinking. This resulted in an increase in the use temperature of the polymers but at the sacrifice of lowering room temperature properties and the use life (long term stability) at elevated temperature (See P. M. Hergenrother, *Polymer Engineering and Science* 16(5), 303 (1976)). Latent crosslinking groups such as cyanato and cyano have been incorporated in PPQs in an attempt to obtain thermally induced crosslinking to reduce the high temperature thermoplasticity (See P. M. Hergenrother, *Macromolecules,* Vol. 7, p. 575 (1974) and P. M. Hergenrother, U.S. Pat. No. 3,852,243 (1974) to the Boeing Company). The PPQs containing cyanato groups were not processable due to the relatively low temperature reaction of these groups which resulted in inhibition of polymer flow. Those containing the cyano group required extremely high temperatures (e.g. more than 400° C.) to effect moderate crosslinking. A trifunctional momoner (a tris(phenyl-α-diketone) was previously used to prepare highly crosslinked PPQs, see R. T. Rafter and E. S. Harrison, *ACS Div. Org. Coatings and Plastics Chem. Prep.,* 35(2), 204 (1975)). These materials were extremely difficult to process as adhesives or composite matrices, requiring high pressures and temperatures. Extremely rigid PPQs with high $T_g$s were prepared using aromatic fused ring tetraamines and aromatic bis(α-diketones), see F. L. Hedberg and F. E. Arnold, *J. Polymer Sci., Polymer Chem. Ed.* 14, 2607 (1976). Ether-ketone-sulfone polymers containing pendant ethynyl groups capable of undergoing a thermally induced crosslinking reaction have been reported, see C. Samyn and C. S. Marvel, *J. Polymer Sci. Polymer Chem. Ed.* 13, 1095 (1975). These polymers were prepared by a route which is entirely different from the present invention. A precursor linear ether-ketone-sulfone polymer containing pendant acetyl groups was subsequently converted to ethynyl groups via the Vilsmeyer reaction. This reaction is known not to occur quantitatively (incomplete conversion and by-product formation). As a result, the crosslinked polymers exhibited poorer thermooxidative stability than anticipated. In an attempt to increase the use temperature ($T_g$) of PPQs, 2,2'-di(phenylethynyl)biphenyl moieties were incorporated within the backbone of the polymer chain. The polymer was subsequently thermally reacted to form rigid 9-phenyldibenz(a,c)-anthracene units, see F. L. Hedberg and F. E. Arnold, *J. Polymer Sci. Polymer Chem. Ed.* 14, 2606 (1976); and F. L. Hedberg and F. E. Arnold, U.S. Pat. No. 3,876,614 (1975) to U.S. Air Force. This work involves intramolecular reaction to rigidize the polymer and thereby differs substantially from the present invention which involves intermolecular reaction crosslinking. The monomer containing the 2,2'-di(phenylethynyl)biphenyl moiety is made by a very difficult multistep route which is economically impractical. Due to the synthetic difficulties, the final polymers have not been thoroughly evaluated. Ethynyl terminated aromatic polyphenylquinoxaline compositions, (or ethynyl end-capped quinoxaline oligomers) which cure by addition reactions are also disclosed in U.S. Pat. No. 3,966,729 to Kovar et al.

Each of these prior art compositions and the various routes employed therein to increase the dimensional stability of PPQs resulted in one or more of the following disadvantages; poor processability, lower long term stability at elevated temperatures, expensive multistep synthetic routes to the monomers, high temperature required for crosslinking, and inability to control the degree of crosslinking.

It is therefore an object of the present invention to provide a new resin composition produced from the polyphenylquinoxalines and containing various amounts of latent crosslinking groups to provide crosslinking.

It is another object of the present invention to provide novel crosslinking resin compositions having improved elevated temperature use capabilities.

A further object of the present invention is a process for improving the use temperature and solvent resistance of selected thermoplastic resins by incorporating in the structure thereof crosslinking groups.

An additional object of the present invention is a process for improving the physical property use characteristics of the polyphenylquinoxaline resins by adding pendant ethynyl or phenylethynyl crosslinking groups thereto.

Other objects and advantages of the present invention will be more readily apparent to those skilled in the art as the same becomes better understood with reference to the following description and specific examples.

SUMMARY OF THE INVENTION

The present invention essentially involves the preparation of polyphenylquinoxalines (PPQs) containing pendant ethynyl or phenylethynyl groups. These polymers are synthesized from the reaction of aromatic bis(o-diamines) (I) with aromatic bis(α-diketones) (II) and novel aromatic bis(ethynylphenyl-α-diketones) or bis(phenylethynylphenyl-α-diketones) (III) as shown in the following scheme:

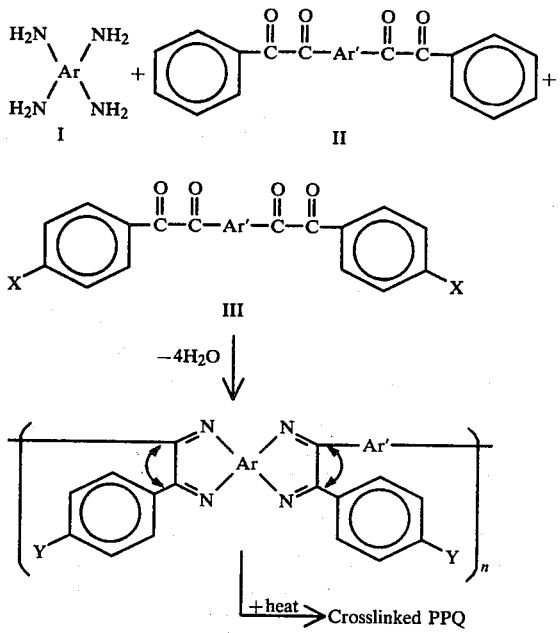

where n is 20–10,000, Ar is aromatic such as

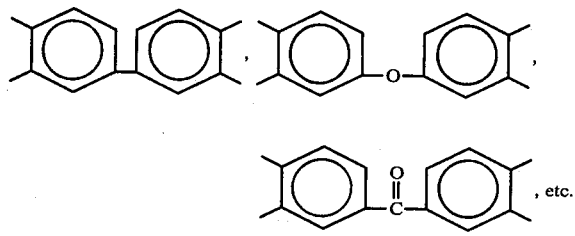

Ar' is

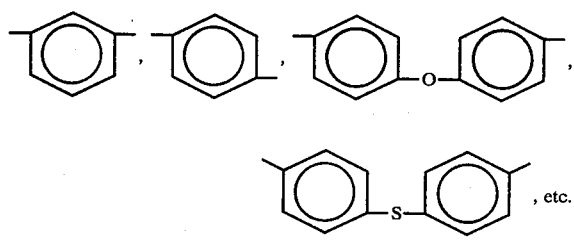

X is

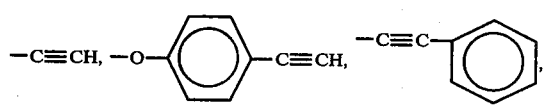

-continued

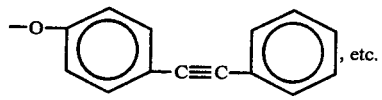

Y is H or

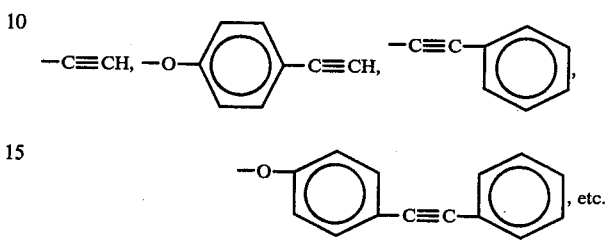

The stoichiometry can be altered as desired to control the amount of pendant ethynyl or phenylethynyl groups and accordingly the crosslinked density. The degree of crosslinking would govern certain properties of the polymers such as the use temperature. As the amount of ethynyl or phenyethynyl groups are increased, the temperature necessary to induce the crosslinking reaction is lowered and the final use temperature of the polymer is raised.

Having generally described the invention, a more complete understanding thereof can be obtained by reference to the following specific examples which are provided herein for purposes of illustration only and are not to be limiting on the invention. A more complete description of the invention relative to the specific examples and test results is set forth in applicant's articles appearing in *Macromolecules*, Vol. 14, pp. 891–904 (July–August, 1981) and which are incorporated herein by reference.

EXAMPLE I 4-(4-Bromophenoxy)benzil

A solution of phenylacetyl chloride (30.8 g, 0.2 mole) and 4-bromodiphenyl ether (60.0 g, 0.2 mole) in carbon disulfide (50 ml) was added dropwise during one hour to a stirred slurry of anhydrous aluminum chloride (30.0 g, 0.23 mole) in carbon disulfide (150 ml) at approximately 15° C. The brown reaction mixture was stirred overnight at ambient temperature and subsequently pored into a stirred mixture of ice and hydrochloric acid. Methylene chloride (100 ml) was added to aid in the workup. The organic phase was washed thoroughly with water, dried over calcium sulfate, treated with charcoal, and concentrated to dryness to yield a slightly tacky tan solid (88 g). The solid was washed in a blender with hexanes (300 ml) to yield a light tan solid (56 g), m.p. 105°–114° C. Recrystallization from a mixture of ethanol (700 ml) and toluene (150 ml) provided a white crystalline solid (40.5 g, 55% yield), m.p. 116°–118° C. The intermediate ketone (27.5 g, 0.075 mole) and selenium dioxide (8.3 g, 0.075 mole) were refluxed overnight in glacial acetic acid (150 ml). The black reaction mixture was filtered and the cooled filtrate poured into cold water to precipitate a yellow solid. Recrystallization from ethanol (200 ml) provides 4-(4-bromophenoxy)benzil as yellow crystals (22.4 g, 78% yield), m.p. 85°–86° C. Mass spectroscopy (MS), no M+, major fragment m/e 275–277 (+CO—$C_6H_4$—O—$C_6H_4$—Br).

EXAMPLE II

4-[4-[(Trimethylsilyl)ethynyl]phenoxy]benzil 4-(4-Bromophenoxy)benzil (3.81 g, 0.01 mole), trimethylsilylacetylene (1.96 g, 0.02 mole), and dichlorobis(triphenylphosphine)palladium (0.30 g) in triethylamine (20 ml) were placed under a nitrogen atmosphere in a sealed flask and heated at 66°–68° C. for four hours. The cooled brown reaction mixture was poured into cold dilute hydrochloric acid to yield a brown oil which was extracted with methylene chloride. The methylene chloride solution was washed with dilute aqueous hydrochloric acid and water, dried over magnesium sulfate, and concentrated on a rotary evaporator to yield a brown gum (4.0 g). The gum was extracted with boiling cyclohexane (100 ml) (small amount remained insoluble) and the solution treated with charcoal, filtered, and concentrated to yield 4-[(4-[trimethylsilyl)ethynyl]phenoxy]benzil as an orange gum (3.4 g, 85% yield). MS, no M+, major fragment m/e 293 [+CO—$C_6H_4$—O—$C_6H_4$—C≡C—Si($CH_3$)$_3$].

EXAMPLE III

4-(4-Ethynylphenoxy)benzil

4-[4-[(Trimethylsilyl)ethynyl]phenoxy]benzil (2.6 g, 0.0065 mole) was dissolved in a mixture of methanol (100 ml) and methylene chloride (10 ml). Potassium carbonate (approximately 0.5 g) was added and the reaction mixture darkened upon stirring for one hour at approximately 40° C. The reaction mixture was poured into cold aqueous dilute hydrochloric acid to yield a brown oil which was extracted with methylene chloride. The organic phase was washed with water, dried over magnesium sulfate, and concentrated to yield an orange gum (2.6 g). The gum was boiled in cyclohexane (100 ml) (some insolubles) and the resultant solution treated with charcoal, filtered, and concentrated to yield 4-(4-ethynylphenoxy)benzil as a yellow gum (1.6 g, 57% yield). MS, M+ 326, major fragment m/e 221 [+CO—$C_6H_4$—O—$C_6H_4$—C≡C—H].

EXAMPLE IV

4,4'-Oxybis(4"-bromobenzil)

4,4'-Oxybis(4"-bromobenzil) was prepared according to a known procedure, see P. M. Hergenrother, *Macromolecules*, vol. 7, p 575 (1974). The acid chloride of (4-bromophenyl)acetic acid was reacted with diphenyl ether in sym-tetrachloroethane in the presence of anhydrous aluminum chloride. The resultant intermediate diketone (m.p. 185°–187° C.) was subsequently oxidized with selenium dioxide in refluxing glacial acetic acid. After recrystallization from benzene, 4,4'-oxybis(4"-bromobenzil) was obtained as a yellow crystalline solid, m.p. 193°–194° C.

EXAMPLE V

4,4'-Oxybis[4"-[(trimethylsilyl)ethynyl]benzil]

4,4'-Oxybis(4"-bromobenzil) (11.8 g, 0.02 mole), dichlorobis(triphenylphosphine)palladium (0.3 g), cuprous iodide (0.1 g), (trimethylsilyl)acetylene (8.3 g, 0.085 mole), triethylamine (25 ml), and pyridine (100 ml) were stirred in a sealed flask under nitrogen at 80° C. for three hours. The orange-brown reaction mixture (contained needles) was poured into cold dilute aqueous hydrochloric acid to precipitate an orange gum. The gum was washed with water, dissolved in benzene (150 ml), and the resultant solution was treated with charcoal, filtered, and concentrated to yield an orange gummy residue (12.5 g). The residue was boiled in cyclohexane (300 ml) and the resultant solution treated with charcoal, filtered, and concentrated to a volume of approximately 100 ml. A pale yellow solid (7.3 g, 58% yield), m.p. 122°–124° C., formed upon cooling, which was recrystallized from cyclohexane (approximately 100 ml) to yield 4,4'-oxybis[4"-[(trimethylsilyl)ethynyl]benzil] as a yellow crystalline solid (5.1 g), m.p. 124°–125° C. MS, no M+, major fragment m/e 201 [+CO—$C_6H_4$—C≡C—Si($CH_3$)$_3$].

EXAMPLE VI

4,4'-Oxybis(4"-ethynylbenzil)

4,4'-Oxybis[4"-[(trimethylsilyl)ethynyl]benzil] (4.4 g, 0.007 mole) was dissolved in hot methanol (500 ml) and the solution cooled to 35° C. Powdered potassium carbonate (2.0 g) was added to the yellow solution and a golden crystalline solid precipitated upon stirring for a few minutes. After stirring for one hour at 30°–35° C., the reaction mixture was cooled and filtered to provide a yellow crystalline solid (2.8 g, 82% yield), m.p. 162°–164° C. The solid was washed with water and dissolved in a hot mixture of methanol (350 ml) and benzene (100 ml), and the resultant solution treated with charcoal and filtered. The yellow filtrate was partially concentrated and cooled to provide 4,4'-oxybis(4"-ethynylbenzil) as a bright yellow crystalline solid (2.1 g), m.p. 164°–165° C. (placed in preheated oil bath at 160° C.). MS, no M+, major fragments at m/e 196, 129 (+CO—$C_6H_4$—C≡CH), and 101 (+$C_6H_4$—C≡CH).

EXAMPLE VII

1,3-Bis[[4-(4-bromophenoxy)phenyl]glyoxylyl]benzene

A solution of the diacid chloride of 1,3-phenylenediacetic acid (46.2 g, 0.2 mole) and 4-bromodiphenyl ether (104 g, 0.41 mole) in carbon disulfide (250 ml) was added dropwise during four hours to a stirred slurry of anhydrous aluminum chloride (56 g, 0.42 mole) in carbon disulfide (200 ml) at approximately 10° C. After complete addition, the dark red reaction mixture was stirred at ambient temperature for three hours and poured into ice and hydrochloric acid. Methylene chloride (300 ml) was added to facilitate the separation and the organic phase was washed thoroughly with water, dried over calcium sulfate, concentrated to a volume of approximately 200 ml, and poured slowly into stirred cyclohexane (600 ml). A white solid (95.6 g) precipitated which melted at 128°–138.5° C. Recrystallization from a 1:1 mixture (800 ml) of benzene and methanol provided the intermediate diketone as a white solid (70.7 g, 54% yield), m.p. 139°–141° C. MS, M+ 656, major fragment m/e 275, 277 (+CO—$C_6H_4$—O—$C_6H_4$—Br). A solution of the intermediate diketone (47.5 g, 0.07 mole) and selenium dioxide (16.0 g, 0.14 mole) in glacial acetic acid (600 ml) was refluxed overnight. The hot black reaction mixture was filtered and the resultant yellow filtrate was cooled to yield a yellow crystalline solid (42. g), m.p. 119°–121° C. (resolidified and remelted at 144°–146° C.). The yellow crystalline solid was recrystallized from a mixture of ethanol (500 ml) and benzene (250 ml) (charcoal treated) and the resultant yellow solution cooled slowly to provide 1,3-bis[[4-(4-bromophenoxy)phenyl]glyoxylyl]benzene as yellow crystals (37.7 g, 79% yield), m.p. 146°–147° C. MS, no M+, major fragment m/e 275, 277 (+CO—$C_6$-

H4—O—C6H4—Br). When the ethanol/benzene recrystallization solution was cooled fast, a kinetically favored crystalline form was obtained which melted at 120°–122° C., resolidified, and remelted at 145.5°–147° C.

EXAMPLE VIII
1,3-Bis[[4-[4-[(trimethylsilyl)ethynyl]phenoxy]phenyl]-glyoxylyl]benzene 1,3-Bis[[4-(4-bromophenoxy)penyl]glyoxylyl]benzene (13.7 g, 0.02 mole), dichlorobis(triphenylphosphine)palladium (0.5 g), (trimethylsilyl)acetylene (8.3 g, 0.85 mole), triethylamine (20 ml), and pyridine (60 ml) were placed in a sealed flask under a nitrogen atmosphere and stirred at 72°–78° C. for four hours. The orange solution darkened to a brown reaction mixture (containing needles) which was poured into cold dilute aqueous hydrochloric acid. A gum precipitated, which slowly solidified to a brown solid. Recrystallization from ethanol (800 ml) after charcoal treatment provided a granular yellow solid (11.0 g) which softened at 105° C., wet at 106° C., and cleared at 113° C. The yellow solid was recrystallized again from ethanol (600 ml) to provide 1,3-bis[[4-[4-[(trimethylsilyl)ethynyl]phenoxy]-phenyl]glyoxylyl]benzene as a fine granular yellow solid (9.1 g, 63% yield), m.p. 109.5°–111° C. MS, no M+, major fragment m/e 293 [CO—C6H4—O—C6H4—C≡C—Si(CH3)3] and 73 [(+Si(CH3)3].

EXAMPLE IX
1,3-Bis[[4-(4-ethynylphenoxy)phenyl]glyoxylyl]benzene 1,3-Bis[[4-[4(trimethylsilyl)ethynyl]phenoxy]phenyl]-glyoxylyl]benzene (5.0 g, 0.007 mole) was dissolved in hot methanol (600 ml) and powdered potassium carbonate (1.0 g) was added. The reaction mixture was heated at reflux for one-half hour and then cooled in ice water. A yellow solid (3.0 g), m.p. 119.5°–121° C. separated and was recrystallized from a 1:1 mixture (150 ml) of benzene and ethanol (charcoal treated). The yellow solution was partially concentrated and cooled to yield 1,3-bis[[4-(4-ethynylphenoxy)phenyl]glyoxylyl]benzene as a yellow solid (2.5 g, 63% yield), m.p. 121°–123° C. MS, no M+, major fragment m/e 221 (+CO—C6H4—O—C6H4—C≡CH).

EXAMPLES X, XI, XII

The three phenylethynyl-substituted α-diketones (see Table I) were prepared by a modification of the procedure employed for the synthesis of ethynyl-substituted α-diketones described in the Examples above. Bromo-substituted α-diketones were reacted with phenylacetylene, using dichlorobis(triphenylphosphine)palladium as catalyst to provide phenylethynyl-substituted α-diketones. The preparation of the bromo-substituted α-diketones is also described above. Details on the synthesis of the phenylethynyl α-diketones are summarized in Table I.

A flask containing an orange solution of 4,4'-oxybis(-4''-bromobenzil) (35.4 g, 0.06 mole), phenylacetylene (15.0 g, 0.15 mole), and dichlorobis(triphenylphosphine)palladium (0.40 g) in pyridine (300 mL) and triethylamine (75 mL) was flushed with nitrogen, sealed, heated, and stirred at approximately 97° C. for four hours. The resultant dark orange solution was poured into methanol (1.4 L) and cooled in a refrigerator overnight to provide a yellow solid (33.3 g, 87% crude yield), m.p. 118°–121° C. Recrystallization from acetone (1.2 L) afforded yellow needles (23 g, 69% recovery) which sintered slightly at 165° C. and melted at 181°–182.5° C. Characterization of the phenylethynyl-substituted α-diketones is provided in Table II. A representative procedure for the preparation of 4,4'oxybis[-4''-(phenylethnyl)benzil] is illustrated by the following reaction:

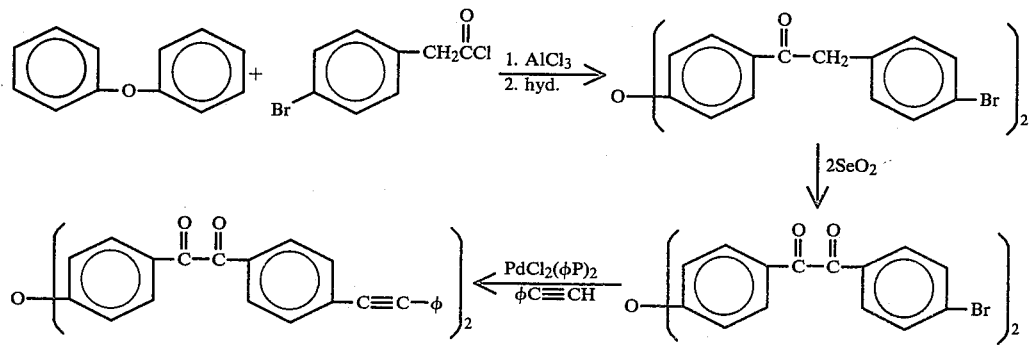

TABLE I
SYNTHESIS OF PHENYLETHYNYL-SUBSTITUTED α-DIKETONES

| | | CRUDE PRODUCT | | | | RECRYSTALLIZED PRODUCT | | |
|---|---|---|---|---|---|---|---|---|
| COMPOUND | REACTION SCALE, MOLE | WORKUP MEDIUM | FORM | YIELD, % | m.p., °C. | SOLVENT | FORM | RECOVERY % | m.p., °C. |
| Ph—C(O)—C(O)—C6H4—O—C6H4—C≡CPh  I | 0.01 | dil aq HCl | orange gum | 120<sup>a</sup> | — | cyclohexane | yellow solid | 45 | 82–83 |

TABLE I-continued
SYNTHESIS OF PHENYLETHYNYL-SUBSTITUTED α-DIKETONES

| | CRUDE PRODUCT | | | | RECRYSTALLIZED PRODUCT | | | |
|---|---|---|---|---|---|---|---|---|
| COMPOUND | REACTION SCALE, MOLE | WORKUP MEDIUM | FORM | YIELD, % | m.p., °C. | SOLVENT | FORM | RECOVERY % | m.p., °C. |
| (structure I) | 0.02 | methanol | yellow solid | 72 | 129–134 | benzene | yellow crystals | 29 | 186.5–187.5 |
| (structure II) | 0.06 | methanol | yellow solid | 87 | 118–121 | acetone | yellow needles | 69 | 181–182.5 |
| (structure III) | | | | | | | | | |

[a] Contains a byproduct from the reaction of phenylacetylene with itself.

TABLE II
CHARACTERIZATION OF PHENYLETHYNYL α-DIKETONES

| COMPOUND NO. (See Table I) | MASS SPECTROSCOPIC DATA | | FORMULA | ELEMENTAL ANAL.,[a] % | |
|---|---|---|---|---|---|
| | M+ | m/e, MAJOR FRAGMENT | | C | H |
| I | m/e 402 | 297, +COC$_6$H$_4$OC$_6$H$_4$C≡CC$_6$H$_5$ | C$_{28}$H$_{18}$O$_3$ | 83.51 (83.56) | 4.56 (4.51) |
| II | ND[b] | 297, +COC$_6$H$_4$OC$_6$H$_4$C≡CC$_6$H$_5$ | C$_{50}$H$_{30}$O$_6$ | 81.85 (82.63) | 4.58 (4.16) |
| III | ND | 205, +COC$_6$H$_4$C≡CC$_6$H$_5$ 196, unknown 177, +C$_6$H$_4$C≡CC$_6$H$_5$ | C$_{44}$H$_{26}$O$_5$ | 83.37 (83.26) | 4.35 (4.13) |

[a] Theoretical values in parentheses.
[b] ND = not detected.

Other Reactants and Monomers 4,4'-Oxydibenzil, m.p. 105°–106° C., 1,3-bis(phenylglyoxylyl)benzene, m.p. 98°–99° C., and 1,3-bis[(4-phenoxyphenyl)glyoxylyl]benzene, m.p. 131°–132° C. were prepared according to known procedures. 3,3',4,4'-Tetraaminobiphenyl was recrystallized from water (20 g/l) containing a pinch of sodium dithionite under nitrogen. Near white crystals, m.p. 176°–177° C. were obtained in 70% recovery. The other reactants such as trimethylsilylacetylene, (4-bromophenyl)acetic acid, 1,3-phenylenediactic acid, etc. were obtained commercially. The polymerization solvent, m-cresol, was redistilled prior to use.

The model compound work was performed to gain insight into the anticipated behavior of the polymers. However, the thermally induced reaction of the model compounds served only as a guid since polymers are expected to behave grossly different due to factors such as differences in molecular mobility and ethynyl or phenylethynyl density.

Polymer

Polymer synthesis was performed by using stoichiometric quantities of monomers in m-cresol at a concentration (w/v) of 10%. When concentrations >10% are desired, the stoichiometry can be upset by a few mole percent in favor of the bis(1,2-diketone) monomer, see P. M. Hergenrother, *Journal of Applied Polymer Science*, vol. 18, pp 1779–1791, (1974), without any severe detrimental effect on the polymer. In this manner, concentrations of 25 to 30% solids can be obtained. In addition, other solvents or mixtures thereof such as chloroform, sym-tetrachloroethane, a mixture of m-cresol and xylene and a mixture of m-cresol and toluene can be used. The bis(1,2-diketone) monomer(s) was stirred in the appropriate volume of m-cresol and powdered 3,3',4,4'-tetraaminobiphenyl was added. The reaction mixture turned a reddish orange color, which eventually faded to provide an amber-colored viscous solution after stirring at ambient temperature for four to six hours and at approximately 90° C. for one hour. A portion of the viscous solution was doctored onto plate glass and stage-dried to a final temperature of 200° C. in vacuo for four to six hours. The resultant transparent yellow film was fingernail creaseable. The remaining m-cresol solution was poured into methanol in a blender to precipitate a yellow solid, which was thoroughly washed in boiling methanol and dried at 90° C. in air. Characterization is given in Tables III and IV for polymers having respective representative structures:

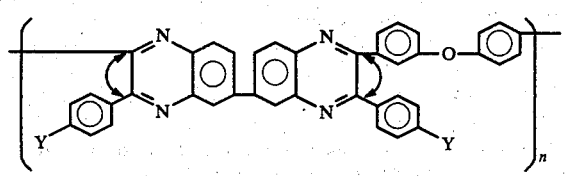

A.

where Y=H or C≡Cφ and n=20 to 10,000

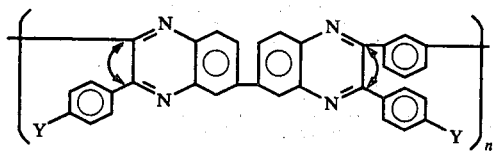

Y=H,

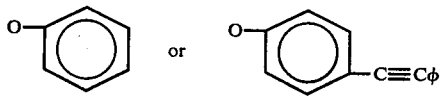

and n=20 to 10,000.

TABLE III
Characterization of Polymers of Structure A
(pendant phenylethynyl groups)

| | | DSC data[b] °C. | | |
|---|---|---|---|---|
| Y | η inh,[a] dL/g | init $T_g$ | Exothermic Peak | Final $T_g$[c] |
| H | 1.54 | 291 | none | 293 |
| H (95%) C≡CPh (5%) | 1.39 | 302 | 450 | 330 |
| H (90%) C≡CPh (10%) | 1.33 | 306 | 448 | 333 |
| H (70%) C≡CPh (30%) | 1.42 | 309 | 434 | ND[d] |
| C≡CPh[e] | 1.05 | 325 | 430 | ND |

[a]Inherent viscosity, 0.5% solution in m-cresol at 25° C.
[b]Heating rate of 20° C./min, nitrogen atmosphere, $T_g$ taken at the inflection point.
[c]After heating to 475° C. in nitrogen.
[d]ND = not detected.
[e]Anal. Calcd for $(C_{56}H_{32}N_4O)_n$: C, 86.58; H, 4.15; N, 7.21. Found: C, 85.48, H, 4.25; N, 7.12.

TABLE IV
Characterization of Polymers of Structure B
(pendant phenylethynyl groups)

| | | DSC,[a] °C. | | |
|---|---|---|---|---|
| Y | η inh,[a] dL/g | init $T_g$ | Exothermic Peak | Final $T_g$[a] |
| H | 0.61 | 313 | none | 315 |
| OC₆H₅ | 0.83 | 246 | none | 249 |
| H (95%) OC₆H₄C≡CPh (5%) | 0.68 | 311 | 448 | 338 |
| H (90%) OC₆H₄C≡CPh (10%) | 0.71 | 309 | 445 | 340 |
| H (70%) OC₆H₄C≡CPh (30%) | 0.64 | 285 | 429 | ND[a] |
| OC₆H₄C≡CPh | 0.43 | 231 | 377 | ND |

[a]See Table III for description.
[b]Anal. Calcd for $(C_{62}H_{36}N_4O_2)_n$: C, 85.69; H, 4.18; N, 6.45. Found: C, 84.33; H, 4.25; N, 6.78.

The two basic polymers A and B shown above, one containing a diphenyl ether moiety in the backbone with pendant phenyl groups and the other containing a 1,3-phenylene unit in the chain with pendant 4-phenoxyphenyl groups, were selected for study. As indicated in Tables III and IV above, polymers containing various amounts of phenylethynyl groups, and in Tables VI and VII below, various amounts of ethynyl groups were prepared by varying the mole percent of the appropriate bis(α-diketone) monomers. Experimental results indicate that as little as 1 mole percent of ethynyl or phenylethynyl groups on PPQ can alter the solubility of the cured polymer. The distribution of the phenylethynyl and ethynyl groups is considered to be random although block segments could be present in certain polymers. For example, the 4,4'-oxybis(4"-ethynylbenzil) monomer was not readily soluble in m-cresol, whereas the 4,4'-oxydibenzil was. The polymerization probably proceeded initially through the predominant reaction of 4,4'-oxydibenzil with the tetraamine followed by reaction of the residual tetraamine and 1,2-diamino end-capped oligomer with the ethynyl-substituted bis(α-diketone). Also, the aromatic bis(phenylethynyl-substituted α-diketone) monomers are less soluble in m-cresol than the aromatic bis(α-diketones). As a result, the polymerization may proceed initially through reaction of the bis(α-diketone) monomer with the tetraamine followed by the reaction of residual tetraamine and 1,2-diamino end-capped oligomer with the phenylethynyl α-diketone monomer.

TABLE V
Characterization of Polymers of Structure A
(pendant ethynyl groups)

| | | DSC data,[b] °C. | | |
|---|---|---|---|---|
| Y | η inh,[a] dL/g | Initial $T_g$ | Exothermic Peak | Final $T_g$[c] |
| H | 1.54 | 291 | none | 292 |
| H (95%) C≡CH (5%) | 1.61 | ND[d] | 324 | 321 |
| H (90%) C≡H (10%) | 1.72 | ND | 313 | 333 |
| H (70%) C≡CH (30%) | 1.93 | ND | 285 | ND |
| C≡CH[e] | 1.23 | ND | 247 | ND |

[a]Inherent viscosity; 0.5% solution in m-cresol at 25° C.
[b]Heating rate of 20° C./min, nitrogen atmosphere, $T_g$ taken at the inflection point.
[c]After heating to 375° C. in nitrogen.
[d]ND = not detected.
[e]Elemental Anal. Calcd for $(C_{44}H_{24}N_4O)_n$: C, 84.59; H, 3.87; N, 8.96. Found: C, 84.58; H, 3.94; N, 8.76.

TABLE VI
Characterization of Polymers of Structure B
(pendant ethynyl groups)

| | | DSC data,[b] °C. | | |
|---|---|---|---|---|
| Y | η inh,[a] dL/g | Initial $T_g$ | Exothermic Peak | Final $T_g$[c] |
| H | 0.61 | 313 | none | 314 |
| OC₆H₅ | 0.83 | 246 | none | 248 |
| H (95%) OC₆H₄C≡CH (5%) | 0.93 | ND[d] | 340 | 323 |
| H (90%) OC₆H₄C≡CH (10%) | 0.82 | ND | 330 | 334 |
| H (70%) OC₆H₄C≡CH (30%) | 1.13 | ND | 313 | ND |
| OC₆H₄C≡CH | 0.47 | ND | 257 | ND |

[a-d]See Table V footnotes above.

Pertinent differential scanning calorimetry (DSC) data for the pendant phenylethynyl groups on the basic polymer structures A and B is shown in Tables III and IV. As shown therein the polymer of structure A, which is void of phenylethynyl groups; has a $T_g$ of 291° C. The $T_g$ of the polymer is increased as phenylethynyl groups are placed on the pendant phenyl groups. As the mole percent of phenylethynyl groups in the polymers is increased, the $T_g$ and intensity of the exotherm are increased while the exothermic peak temperature is decreased. The exotherm is due to the reaction of the phenylethynyl groups, as evidenced by infrared spectroscopic work before and after the thermal exposure (disappearance of the C≡C stretch at 2220 cm⁻¹).

Samples of each phenylethynyl-substituted PPQ were cured in the DSC cell by heating to 475° C. under nitrogen. Each sample retained its original yellow color. The samples were cooled and rerun. As shown in Tables III and IV, the $T_g$'s of the 475° C. cured polymers increased as the mole percent of phenylethynyl groups increased, presumably due to crosslinking. The $T_g$ of the 475° C. cured polymers containing 30 and 100 mol% phenylethynyl groups could not be detected.

In general, the cured phenylethynyl-substituted polymers of structure B exhibited $T_g$'s higher than those of structure A. As the mole percent of phenylethynyl groups was increased in the polymers of structure B, a more drastic decrease in the exothermic peak temperature was observed. This is apparently due to greater mobility of the 4-(phenylethynyl)phenoxy group in polymers of structure B relative to the more rigid phenylethynyl group in polymers of structure A. As shown in Table IV, introduction of the bulky but flexible phenoxy group into the para position of the pendant phenyl group on the polymer resulted in a significant lowering of the $T_g$.

As indicated in Tables V and VI, no initial $T_g$ could be detected by DSC for the ethynyl-containing polymers because it was masked by the broad exothermic reaction of the ethynyl groups. After heating a sample to 375° C. in nitrogen, cooling, and rerunning the same sample, those polymers containing 5 and 10 mol% ethynyl groups exhibited a $T_g$. The $T_g$ of polymers containing 30 and 100 mol% ethynyl groups could not be detected after heating to 375° C., apparently due to the high crosslink density.

As the mole percent of ethynyl groups in the polymer increased, the temperature of the exothermic peak decreased and the intensity of the exotherm increased. The exotherm is presumably due to the reaction of an ethynyl group with another, in contrast to other reactions such as the addition of the ethynyl group across an aromatic ring. High ethynyl density permitted the reaction to occur at a lower temperature (less time required for the ethynyl groups to collide), which resulted in an intense exotherm. As the ethynyl density decreased, more time was required for collision and obviously fewer groups reacted, resulting in less heat generated.

The $T_g$'s of polymers containing no ethynyl groups were included in Tables V and VI for comparison and exhibited essentially no increase after heating to 375° C. in nitrogen. Those polymers containing ethynyl groups which were exposed to 375° C. exhibited $T_g$'s higher than the corresponding unsubstituted polymers. This is due to thermally induced crosslinking.

The polymers containing phenylethynyl and ethynyl groups were also characterized by torsional braid analysis (TBA) with the results thereof being given in applicant's referenced report but omitted herein in the interest of clarity.

Films of the polymers in Table III were subjected to thermal mechanical analysis (TMA) or film elongation via a Du Pont Model 990 thermal analyzer. Solution-cast films which were dried in vacuo at 200° C. exhibited elongation in the general temperature range where the apparent initial $T_g$ by DSC was found. Specimens of these films were conditioned in the TMA apparatus to induce crosslinking by heating at 350° C. for 0.5 hour under a nitrogen blanket. The 200° C. dried film of the polymer containing 30 mol% phenylethynyl groups began to stretch at approximately 310° C. and as the temperature was increased, crosslinking occurred. After a film of this polymer was conditioned at 350° C. for 0.5 hour, crosslinking occurred, which resulted in an increase in the $T_g$ (392° C.). The same trend occurred in films of the polymer containing 100 mol% phenylethynyl groups. The 200° C. dried film exhibited a $T_g$ of 329° C., which compares favorably with the 326° C. found by DSC. After conditioning of the film at 350° C., the $T_g$ increased to approximately 400° C. due to induced crosslinking. All of the films from the phenylethynyl-substituted polymers in Table III exhibited an increase in the $T_g$ as the mole percent of phenylethynyl groups increased.

Films of the polymers in Table V were dried at 350° C. in nitrogen for 0.5 hour and also subjected to TMA (film elongation) at a heating rate of 5° C./min. The drying conditions induced crosslinking in those polymers containing ethynyl groups. The films of the polymers containing 0 and 5 mol% ethynyl groups exhibited pronounced elongation near their $T_g$'s. The apparent $T_g$ increased as the amount of ethynyl groups (crosslinking) increased in the films.

Several of the polymers in Tables III and IV cured at 350° C. for one-half hour in nitrogen and several of the polymers in Tables V and VI were subjected to thermogravimetric analaysis (TGA) at a heating rate of 2.5° C./min. All of the polymers exhibited essentially the same TGA curves, with polymer decomposition temperatures in air and nitrogen of approximately 540° and 550° C. respectively.

Similar to linear poly(phenylquinoxalines), the phenylethynyl containing poly(phenylquinoxalines) in Tables III and IV and the ethynyl-containing poly(phenylquinoxalines) in Tables V and VI were readily soluble at ambient temperature in solvents such as m-cresol, chloroform, and sym-tetrachloroethane at concentrations of 20% (w/v) and insoluble in highly polar solvents such as N,N-dimethylacetamide and dimethyl sulfoxide. After heating at 350° C. for 0.5 hour in nitrogen, films from the phenylethynyl and the ethynyl-containing polymers failed to exhibit even partial solubility in chloroform, sym-tetrachloroethane, or m-cresol, whereas films from polymers void of these groups readily dissolved. The films of the polymers containing 5 mol% phenylethynyl and ethynyl groups exhibited slight swelling, whereas no detectable swelling was observed in the films containing 10 mol% or more of these groups. In addition, films of polymers containing 5, 10 and 30 mol% phenylethynyl and films containing like amounts of ethynyl groups which were dried for several hours at 150° C. in vacuo were also insoluble in chloroform and m-cresol. The phenylethynyl and ethynyl group can thus react at moderate temperatures to provide crosslinking.

The processability of the polymers was readily demonstrated by taking individual samples in powder form from the polymers shown in Tables III and IV and from those shown in Tables VI and VII, and sandwiching these powders between aluminum foil. The individual foil sandwich were then introduced into a preheated press at 371° C., subjected to approximately 0.69 MPa (approximately 100 psi) pressure, and held under these conditions for 0.5 hour. The polymers containing no phenylethynyl and no ethynyl groups fused to form transparent orange films. The polymers containing 5 and 10 mol% of either of these groups exhibited partial to good fusion to form opaque films with some integrity. Polymers containing 30 and 100 mol% of either the phenylethynyl or ethynyl groups failed to completely fuse and formed compressed powder disks which easily crumbled upon handling. On the basis of these findings, poly(phenylquinoxalines) containing more than 30 mol% phenylethynyl or more than 10 mol% ethynyl groups are not amenable to processing in the conventional manner as laminating resins or adhesives.

The phenylethynyl and ethynyl groups readily crosslink at elevated temperatures to reduce the flow and inhibit the processability of the polymers. However, these materials may show promise as coatings for use in a hostile environment since they can be applied in solution form and subsequently crosslinked.

It is thus seen that the present invention provides novel relatively high weight, soluble, linear poly(phenylequinoxalines) containing pendant phenylethynyl or ethynyl groups and the process for preparing same. The thermally induced reaction of these pendant groups provide insoluble crosslinked polymers with high glass transition temperatures ($T_g$'s). Depending upon the phenylethynyl and ethynyl density, polymers containing these groups exhibit good to poor processability by compression molding. Also, cured phenylethynyl and ethynyl containing polymers exhibited higher glass transition temperature than that of corresponding polymers containing neither of these groups. Controlled amounts of crosslinking of polymers via the pendant phenylethynyl and ethynyl groups amounts was also demonstrated or the PPQ and this crosslinking route can be extended to a variety of other polymer systems.

The invention described herein may be extended to most other polymer systems where the use temperature or solvent resistance thereof needs to be improved.

It is thus seen that the specific Examples given herein are illustrative of a novel route or approach to preparing novel relatively high weight soluble linear poly(phenylquinoxalines) with pendant phenylethynyl or ethynyl groups that are readily crosslinked at moderate temperatures to provide a cured material with higher use temperature and solvent resistance property characteristics.

The specific Examples described herein are to merely illustrate the invention and are not to be deemed as exhaustive. Thus, various modifications and variations of the present invention will be apparent to those skilled in the art without departing from the spirit and scope of the appended claims.

What is claimed as new and desired to be secured by Letters Patent of the United States is:

1. A poly(phenylquinoxaline) polymer consisting essentially of repeating units and synthesized from the reaction of (I) aromatic bis(o-diamines) with (II) aromatic bis(α-diketones) and (III) aromatic bis(ethynylphenyl-α-diketones) or aromatic bis(phenylethynyl-α-diketones) according to the reaction scheme:

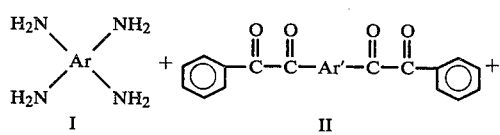

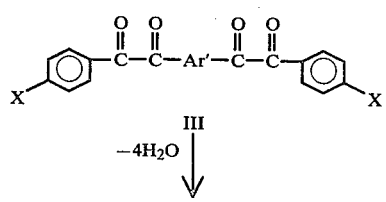

where Ar is aromatic and selected from the group consisting of

[structures shown]

Ar' is

[structures shown], or

[structure shown]

X is —C≡CH,

—O—⟨phenyl⟩—C≡CH, —C≡C—⟨phenyl⟩, or

—O—⟨phenyl⟩—C≡C—⟨phenyl⟩

Y is 5–100% X and 0–95% H, and, n is 20–10,000.

2. The polymer of claim 1 wherein Ar is

[structure shown].

3. The polymer of claim 1 wherein Ar is

[structure shown].

4. The polymer of claim 1 wherein Ar is

[structure shown].

5. The polymer of claim 1 wherein Ar' is

[structure shown].

6. The polymer of claim 1 wherein Ar' is

7. The polymer of claim 1 wherein Ar' is

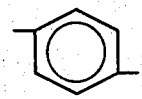

8. The polymer of claim 1 wherein Ar' is

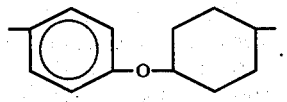

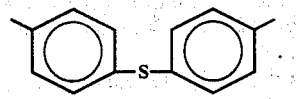

9. The polymer of claim 1 wherein Y is —C≡CH.
10. The polymer of claim 1 wherein Y is

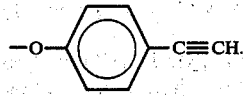

11. The polymer of claim 1 wherein Y is

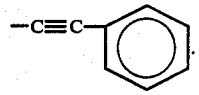

12. The polymer of claim 1 wherein Y is

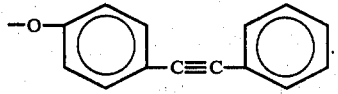

13. The polymer of claim 1 where Y is at least 5 mole percent of —C≡CH and the remaining mole percentage being H.

14. The polymer of claim 1 wherein Y is at least 5 mole percent

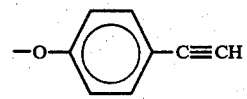

and the remaining mole percentage being H.

15. The polymer of claim 1 wherein Y is at least 5 mole percent

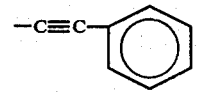

and the remaining mole percentage being H.

16. The polymer of claims 1 wherein Y is at least 5 mole percent

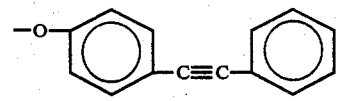

and the remaining mole percentage being H.

17. The product produced by subjecting polymers of claim 1 to temperatures in the range of 150°–475° C. for approximately 0.5 hour, wherein said polymers under go crosslinking via Y.

18. A polyphenylquinoxaline polymer consisting of repeating units and synthesized according to the reaction:

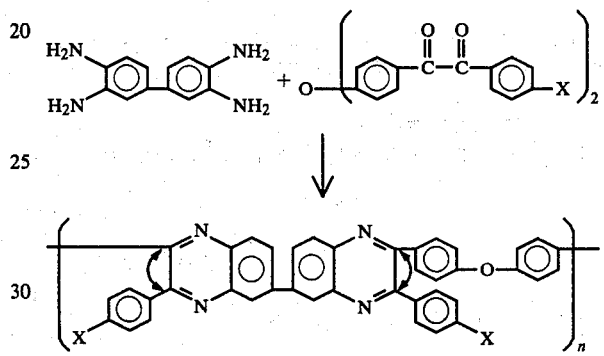

where X is 0–95% H and 5–100% C≡CH, and, n is 20–10,000.

19. A polyphenylquinoxaline polymer consisting of repeating units and synthesized according to the reaction:

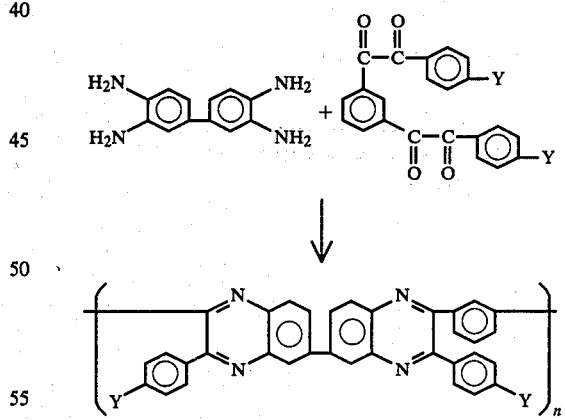

where Y is 0–95% H and 5–100% of a member selected from the group consisting of:

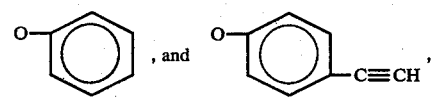

and, n is 20–10,000.

20. A polyphenylquinoxaline polymer consisting essentially of repeating units having the formula:

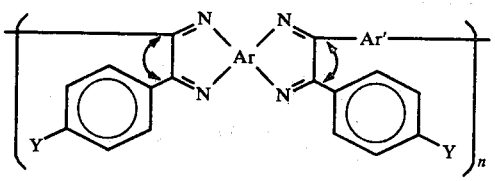

where Ar is a tetravalent aromatic group, Ar' is selected from the group consisting of

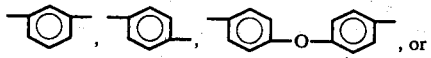, or

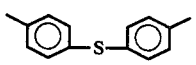

Y is 0–95% H and 5–100% of a member selected from the group consisting of —C≡CH,

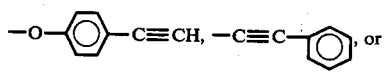, or

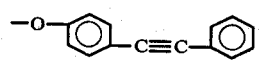

and, n is 20–10,000.

21. A method of synthesizing novel polymers comprising:
combining stoichiometric quantities of a bis(1,2-diketone) monomer in a solvent selected from a group consisting of chloroform, sym-tetrachloroethane, m-cresol, and mixtures of m-cresol and xylene and m-cresol and toluene at a concentration of 10 to 30% weight/volume with powdered 3,3′4,4′-tetraaminobiphenyl stirring the mixture for 4–6 hours at ambient temperature and thereafter stirring for one hour at 90° C. to recover an amber colored viscous solution, doctoring a portion of this solution onto a glass plate and stage drying to a final temperature of approximately 110° C. under vaccum for 4–6 hours to yield a transparent yellow film fingernail creaseable polymer.

22. The method of claim 21 wherein the bis(1,2-diketone) monomer is selected from the group of monomers consisting of:
4-(4-trimethylsilylethynylphenoxy)benzil,
4-(4-ethynylphenoxy)benzil,
4-4′-oxybis(4″-trimethylsilylethynylbenzil),
4,4′-oxybis(4″-ethynylbenzil),
1,3-bis[4-(4-trimethylsilylethynylphenoxy)phenylglyoxylyl]benzene,
1,3-bis[4-(4-ethynylphenoxy)phenylglyoxylyl]benzene,
4,4′-oxybis(4″-phenylethynylbenzil), and
1,3-bis[4-(4-phenylethynylphenoxy)phenylglyoxylyl]benzene.

* * * * *